Patented June 14, 1949

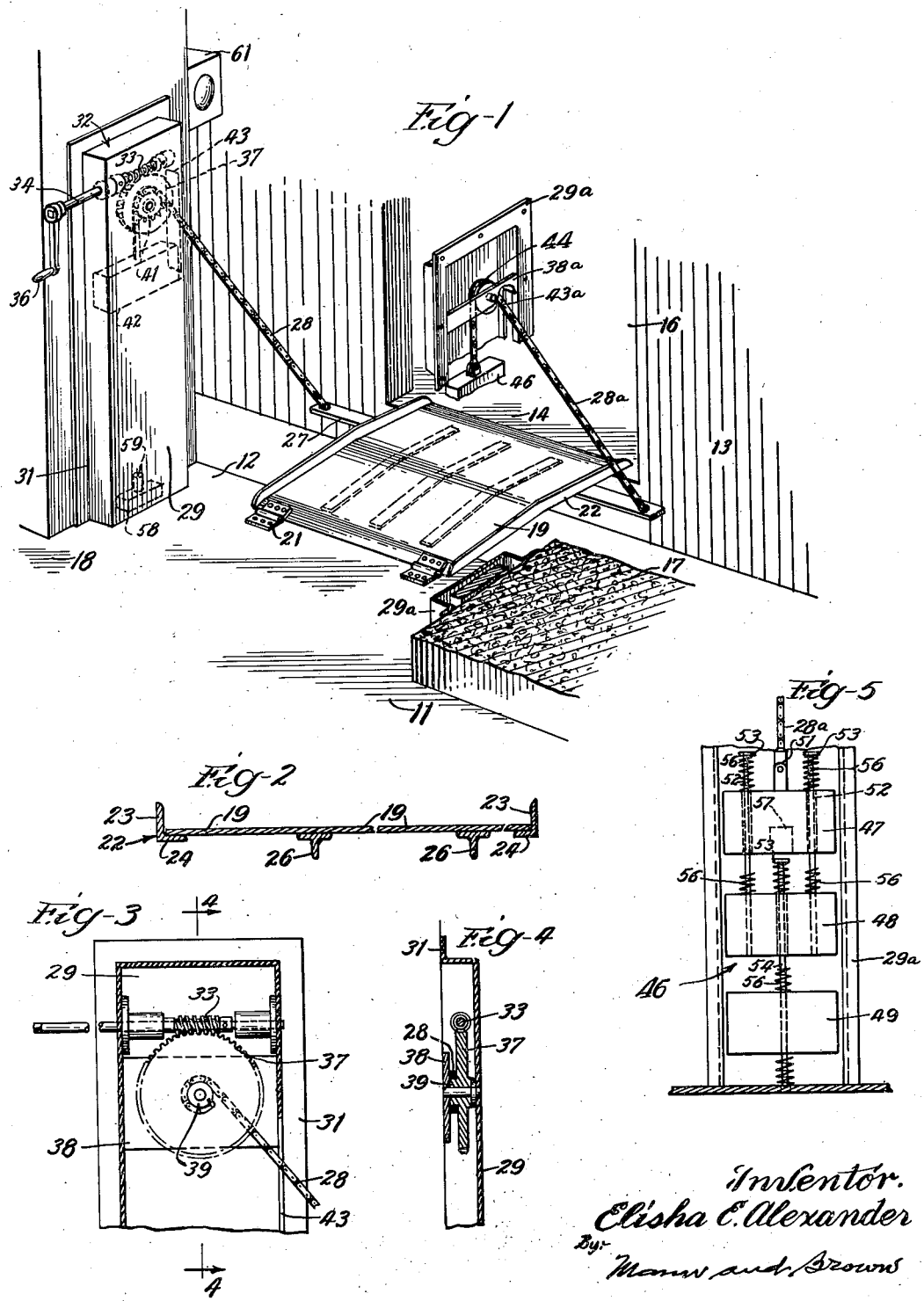

2,473,126

UNITED STATES PATENT OFFICE 2,473,126

FREIGHT PLATFORM BRIDGE

Elisha E. Alexander, Chicago, Ill.

Application April 26, 1946, Serial No. 665,142

2 Claims. (Cl. 14—71)

This invention relates to bridge means for spanning a gap between a freight car floor and a freight platform, being more particularly directed to the provision of a hinged bridge and bridge-operating mechanism for use in door openings of enclosed freight platforms or similar structures.

Freight platforms vary widely in structure according to their intended use and in many instances fixed openings are provided through which freight may be moved, usually by lift trucks, to and from freight cars disposed on tracks paralleling the edge of the platform. It is impractical to locate the edge of such platforms close to the tracks since freight cars vary substantially in width and, in addition, occasionally tilt inwardly due to improper loading or structural defects. A substantial gap will therefore usually exist between the floor of the freight car and a freight platform varying from one to several feet. Furthermore, the height of the freight car floor above the ground level varies considerably, in some instances, through a range of approximately fifteen inches, thereby increasing the difficulty of spanning the gap between the freight car floor and the floor of the freight platform.

Relatively heavy steel plates, often one-half inch thick, are customarily employed to bridge the gap and are manually placed in position. The weight and other characteristics of these plates make them cumbersome, dangerous and unsatisfactory for their intended purpose.

An important object of my invention is to overcome these and other difficulties through the provision of a bridge of the type described which can be permanently installed on a freight platform and can be safely and easily raised and lowered with little effort into contact with freight car floors at varying levels and which provide means for increasing the safety of the bridge while in use.

Other objects will become apparent from the following detailed description and from the attached drawings in which Figure 1 is a partially sectioned perspective view of my device;

Figure 2 is a cross section of the bridge;

Figure 3 is a sectioned end elevation of a modified winch;

Figure 4 is a cross section taken along the lines 4—4 of Figure 3; and

Figure 5 is a partially sectioned view of a counterweight.

I have selected an embodiment of my invention particularly applicable in connection with enclosed freight platforms having door openings, but it is to be understood that I do not wish to specifically confine myself to the herein described details and applications except in so far as defined in the appended claims.

Referring to Figure 1, a freight platform having a floor 11 terminating in a sill 12 is disposed adjacent a railroad track upon which may be located a freight car, generally designated 13, having a floor 14 and a door opening 16. In some instances the freight platform floor 11 may be enclosed by walls 17 having door openings generally designated 18. A bridge, generally designated 19, is suitably attached, as by hinges 21, to the floor 11 a short distance inwardly from the sill 12 and is of a width slightly less than the minimum width of the smallest freight car door opening 16 which will, in most instances, be substantially less than the width of the freight platform door opening 18. The bridge 19 is arched, the peak of the arch being substantially parallel to the ends of the bridge and to the sill 12 of the freight platform 11. The arch of the bridge 19 is sufficiently great to permit the free end of the bridge to descend to a level below that of the freight platform 11 into contact with the floor 14 of the freight car without contacting the sill 12. In most instances an arch sufficiently great to permit the free end of the bridge to descend to a point approximately eight inches below the level of the sill 12 will be sufficient if the level of the sill 12 has been selected as the median point in the range of probable freight car floor heights.

Angle iron reinforcing members 22 having a vertical leg 23 and a horizontal leg 24 are attached by suitable means to the bridge 19 along the edges thereof with the upper face of the lower leg 24 in contact with the bottom surface of the bridge 19 in such manner that the vertical leg 23 extends upwardly beyond the upper surface of the bridge 19 and acts as a guide rail to prevent trucks or other wheeled vehicles, as well as men, from slipping over the bridge. Additional reinforcing means such as T beams 26 may be welded or otherwise attached to the undersurface of the bridge 19 generally parallel to the sides thereof and following the arch of the bridge. It is not essential that this particular pattern of reinforcing be employed, although it has been found very satisfactory in use. Regardless of the particular pattern employed, the beams 26 should terminate a short distance from each end of the bridge 19 in order that as the free end descends below the level of the sill 12, the T beams 26 will not be brought into contact with the sill 12 or with the floor 14 of the freight car 13.

A drawbar 27 is welded or otherwise attached to the undersurface of the bridge 19 and extends outwardly therefrom generally parallel to the sill 12 a distance approximately equal to the width of the opening 18. Flexible means such as chains 28 are secured to the extremities of the drawbar 27. A metal housing 29 having an external flange 31 is attached to the ends of the walls 17 or to other suitable support means and houses a winch, generally designated 32, in operative engagement with the flexible chain means 28. The winch 32 may suitably comprise a worm and worm wheel type having a worm 33 journalled in the housing 29 generally parallel to the sides of the bridge 19. A shank 34 fixed to the worm 33 extends outwardly from the housing and is suitably shaped for engagement with a removable handle 36 for rotating the worm. A worm wheel 37 having an axis transverse to the axis of the worm 33 is journalled in the housing 29 and in a transverse back plate 38 attached to the rear of the housing 29 and is provided with an elongated hub 39 disposed between the back plate 38 and the worm wheel 37.

A sprocket 41 adapted to engage the flexible chain means 28 is mounted on the hub for rotation with the worm wheel 37 in such manner that movement of the handle 36 will rotate the worm 33, the worm wheel 37, and the sprocket 31 causing the bridge 19 to move about its hinges 21. If desired, a counterweight 42 may be attached to the free end of the flexible chain means 28 below the sprocket 41. A suitable opening 43 is formed in a face of the housing 29 to permit free movement of the flexible chain means 28 around the sprocket 41.

A similar housing 29a having a back plate 38a is attached to the wall 17 on the opposite side of the door opening 18 and houses a pulley 44 journalled in the housing 29a, and the back plate 38a. Flexible chain means 28a secured to the drawbar 27 is led through an opening 43a in the housing over the pulley 44 and downwardly to a counterweight 46. It is obvious that the bridge 19 must have sufficient strength to support the heavy loads which will be moved to and from the freight platform 11 and will therefore be of substantial weight. As the bridge is lowered from a raised position the moment of the bridge about its hinges 21 will increase thereby requiring an increasing counterweight to counterbalance the weight of the bridge as it is being lowered. To overcome this variable moment, I may provide a counterweight 46 of the type illustrated in Figure 5 comprising a first weight 47, a second weight 48, and a third weight 49, and dispose one above the other in the housing 29a. The first weight 47 is attached to a flexible chain means 28a by a clevis 51 and is connected to the second weight 48 by a pair of rods 52 extending reciprocably through suitable openings in the first weight 47. The rods 52 have heads 53 of a diameter greater than the diameter of the openings through the first weight 47. A similar rod 54 is attached to the third weight 49 and extends through a suitable opening in the second weight 48 also terminating in a head 53. Resilient means 56, such as springs, are interposed in each instance on the rods 52 and 54 between the heads of the rods and the weights as well as between adjacent weights.

When the bridge 19 is in raised position, the weights 47, 48 and 49 are substantially in contact with each other but as the bridge is lowered, the flexible chain means 28a moves the first weight 47 upwardly. After this weight has traveled a predetermined distance, the springs 56 working against the rod heads 53 will cause the second weight 48 to move upwardly. Similarly, after the second weight 48 has moved through a predetermined distance, the spring 56 acting on the head of the rod 54 will cause the third weight 49 to move upwardly thereby increasing the effective weight of the counterweight and counterbalancing the increased moment of the bridge 19 about its hinges 21. As the bridge is raised, the reverse of the above described operation occurs, each of the weights successively coming to rest on the weight immediately below and reducing the effective weight of the counterweight as the moment of the bridge decreases.

It should be noted that the rod 54 may project upwardly beyond the second weight 48 a substantial distance. If desired, therefore, the first weight 47 may be recessed as at 57 to receive the projecting head of the rod 54.

The component parts of the bridge and operating mechanism are disposed in such manner that the bridge 19 never assumes a vertical position, and the total mass of all counterweights is adjusted to permit lowering of the bridge by its own weight. If the arrangement of parts is such that no portion of the structure is available to limit the upward travel of the bridge, stops may be attached to the chains 28 and 28a or to other suitable portions of my device for such purpose.

A normally closed limit switch 58 having an upwardly projecting spring-impelled operating plunger 59 may be disposed on the platform floor 11 within the housing 29 and connected to a warning light 61 preferably secured to the outer wall of the building in such manner that the light is visible in both directions along the side of the building. The switch 58 is also connected to a suitable source of power. When the bridge 19 is in raised position, the counterweight 42 depresses the plunger 59 opening the switch 58 but immediately upon starting the bridge 19 downwardly, the upward movement of the counterweight 42 permits the plunger 59 of the switch 58 to move upwardly closing the circuit to the light 61 and displaying a warning signal cautioning against movement of the freight car 13. It is not to be understood, of course, that the switch 58 must necessarily be located in the above described position as it may be easily disposed in other locations as, for example, against the side of the housing 29 in such manner that the plunger 59 will project outwardly into contact with the bridge 19 or drawbar 27 when the bridge is in raised position. It is essential, however, that the switch be disposed in such manner that the warning light 61 will be energized promptly upon initiation of lowering movement of the bridge 19.

If greater mechanical advantage is required, an alternative form of which construction illustrated in Figures 3 and 4 may be employed. The structure herein illustrated is substantially similar to that previously described in connection with the winch 32 except that the flexible chain means 38 is secured to the hub 39, the sprocket 41 being eliminated, and the space between the worm wheel 37 and the back plate 38 is selected to substantially equal the width of the chain 28. When the bridge is in lowered position, the mechanical advantage imparted by this arrangement will be at a maximum since the diameter of the hub 39 is relatively small and will increase as the bridge is raised since the chain 28 will be wound upon itself around the hub 39 increasing the effective diameter of the hub and therefore reducing the leverage available.

I prefer to employ a worm and worm wheel wherein the pitch of the worm is relatively low thereby permitting operation by one man and eliminating any reaction to the handle 36 from the weight of the bridge 19 regardless of the position of the bridge. Employment of other gear arrangements, as for example spur and bevel gears, is undesirable since the weight of the bridge 19 is, in many instances, sufficient to rotate the handle 36 unexpectedly with a considerable degree of violence. Further safety considerations include the side rails 22, preventing men or trucks slipping over the edge of the bridge, and the warning light 61 preventing movement of the car 13 while the bridge is lowered.

I claim:

1. In combination, a bridge member hinged to a platform adjacent an edge thereof, an upright support attached to said platform, flexible means attached at one end to the bridge and extending over pulley means carried by said support with the other end of the flexible means being secured to the uppermost of a superposed series of counterweights, and with spring means interconnecting the series whereby the effective number of counterweights increases as the bridge is lowered with the interposed spring means cushioning and graduating the application of the series of counterweights.

2. In combination, a bridge member hinged to a platform adjacent an edge thereof, an upright support attached to said platform, pulley means on said support, flexible means attached at one end to the bridge and extending over the pulley means with the other end of the flexible means being secured to the uppermost of a superposed series of counterweights, and means for increasing the effective number of counterweights as the bridge is lowered, said last-named means including an elongated member secured to one of said counterweights and extending through an opening in the next adjacent counterweight and movable relative thereto, and a head on said elongated member larger than the opening in said last-mentioned counterweight whereby the next lower counterweight is picked up.

ELISHA E. ALEXANDER.

REFERENCES CITED

The following references are of record in the file of this patent:

UNITED STATES PATENTS

| Number | Name | Date |
|---|---|---|
| 58,492 | Smith | Oct. 2, 1866 |
| 309,812 | Winter | Dec. 23, 1884 |
| 691,035 | Wilkens | Jan. 14, 1902 |
| 747,836 | Anderson | Dec. 22, 1903 |
| 749,595 | Van Doorn | Jan. 12, 1904 |
| 1,139,240 | Viche | May 11, 1915 |
| 1,380,229 | Manheim | May 31, 1921 |
| 1,600,021 | Tomkinson | Sept. 14, 1926 |
| 1,694,516 | Prescott | Dec. 11, 1928 |
| 1,700,464 | Brown, Jr. | Jan. 29, 1929 |
| 2,141,529 | Gravelle | Dec. 27, 1938 |